3,015,672
DIHYDROXYBIPHENYL CARBOXYLIC ACID MANUFACTURE
Melvin E. Baum, Monroeville, and Donald E. Hostetler, Verona, Pa., assignors to Koppers Company, Inc., a corporation of Delaware
No Drawing. Filed Mar. 17, 1960, Ser. No. 15,530
4 Claims. (Cl. 260—520)

This invention relates to the preparation of dihydroxybiphenyl carboxylic acids. In one specific aspect, it relates to a novel method of making 4,4'-dihydroxybiphenyl-2-carboxylic acid from fluorene-2,7-disulfonic acid.

In recent years there has been renewed interest in the various chemical compounds that can be derived from fluorene, a constituent of coal tar. One of the more promising fluorene derivatives is fluorene-2,7-disulfonic acid, a compound which can be prepared in good yield by the selective sulfonation of fluorene. It is known that fluorene-2,7-disulfonic acid can be converted to 4,4'-dihydroxybiphenyl-2-carboxylic acid. This compound is of particular interest since both it and its lower alkyl esters have remarkable antioxidant, bactericidal and lubricating properties.

Unfortunately, workers in the art have experienced considerable difficulty in obtaining commercially satisfactory yields of 4,4'-dihydroxybiphenyl-2-carboxylic acid using fluorene-2,7-disulfonic acid as a starting material. Schmidt et al., Ann. 390, 210 (1912), fused the potassium salt of fluorene-2,7-disulfonic acid with potassium hydroxide at 320° C. and obtained a 30% yield of a product which they erroneously identified as 2,7,9,9-tetrahydroxy fluorene. Thirteen years later Courtot et al., Compt. Rend. 180, 1665 (1925), clearly identified the product of Schmidt et al. as 4,4'-dihydroxybiphenyl-2-carboxylic acid. In the course of their work, Schmidt et al. attempted to improve the poor yields of their process by adding an oxidant, potassium chlorate, to the fusion mass. When this was done, none of the desired product was obtained.

Quite surprisingly, we have discovered a novel fusion technique whereby an alkali metal salt of fluorene-2,7-disulfonic acid is fused with an alkali metal hydroxide to give 4,4'-dihydroxybiphenyl carboxylic acid in yields of up to 90% and higher.

It is, therefore, an object of the present invention to provide an improved fusion technique for making 4,4'-dihydroxybiphenyl-2-carboxylic acid in yields which are significantly higher than those heretofore obtainable using methods known to the art.

In accordance with the invention, an alkali metal salt of fluorene-2,7-disulfonic acid is admixed with an alkali metal hydroxide, the alkali metal hydroxide being present in a weight ratio of 1:1 to 2.5:1 based upon the weight of disulfonic acid salt. The admixed mass is heated to a temperature of about 240–280° C. to effect fusion thereof and 4,4'-dihydroxybiphenyl-2-carboxylic acid is recovered from the fused mass.

In a unique embodiment of the invention we have found that, for purposes of the fusion step, there is a marked difference between sodium hydroxide and other alkali metal hydroxides. From the standpoint of the generic invention, potassium hydroxide, for example, if used in the proper weight ratio, can be fused with an alkali metal salt of fluorene-2,7-disulfonic acid within the critical temperature range of the invention to give the desired dihydroxybiphenyl carboxylic acid in yields of 85–90% and higher. Sodium hydroxide, when used under the same conditions, produces only minor hydrolysis in the absence of a carefully defined amount of alkali metal nitrate. Since sodium hydroxide, because of its low cost, is the preferred alkali metal hydroxide for use in the invention, an important aspect of the invention comprises effecting the fusion between the alkali metal salt of fluorene-2,7-disulfonic acid and sodium hydroxide in the presence of an alkali metal nitrate.

Fluorene-2,7-disulfonic acid, the basic starting material for the method of the invention, can be obtained by the sulfonation of fluorene in any known manner. Berthelot, Ann. de Chim. et de Phys. (4) XII, 479 (1867), obtained a fluorene sulfonic acid by treating fluorene with concentrated sulfuric acid or oleum using mild heating conditions. Schmidt et al., supra, prepared fluorene-2,7-disulfonic acid in an 85% yield in admixture with other isomers by treating fluorene with a 330% excess of concentrated sulfuric acid on a steam bath. By the Schmidt procedure the mixed sulfonic acids were isolated as the barium salts and purified as the potassium salts.

Since the Schmidt et al. procedure requires a considerable excess of sulfonating agent and a tedious purification step, we have found the following technique to be more satisfactory. Fluorene, which melts at 114° C., is rendered molten and a 25–100% excess, based upon the stoichiometric requirement, of a sulfonating agent is added thereto. The sulfonating agent can be concentrated sulfuric acid (98%) or oleum containing up to 20% free $SO_3$. If dilute sulfuric acid is used, the reaction tends to stop at the mono-sulfonation stage and if the oleum is too strong (too high in $SO_3$ content) the reaction mixture has a tendency to become an intractible mass. A certain excess of sulfonating agent is required to obtain substantially complete sulfonation, but it is obviously economically desirable to use the smallest possible amount. During the sulfonation the reaction temperature is increased to 160–180° C. Below 160° C. sulfonation is incomplete and above 180° C. the yield of product is greatly diminished by oxidative decomposition, polysulfonation and sulfone formation. The crude sulfonation mass thus formed contains about 85–90% disulfonic acid and 6–10% monosulfonic acid.

The principal sulfonation product, fluorene-2,7-disulfonic acid, is converted to its alkali metal salt for use in the invention. The alkali metal salt is made by treating the disulfonic acid with at least a stoichiometric quantity of any water-soluble alkali metal salt or alkali metal hydroxide. This is most easily accomplished by adding an aqueous solution of any desired concentration containing the alkali metal salt or alkali metal hydroxide to the crude sulfonation mass. If the resulting mixture is sufficiently dilute (and it can be diluted by adding more water), the alkali metal salts of the mixed sulfonic acids will precipitate from solution. Since the alkali metal salt of the mono-sulfonic acid is less soluble in water than the alkali metal salt of the disulfonic acid, the two materials are readily separated by redissolving the filter cake in boiling water and cooling. The alkali metal fluorene-2-sulfonate will precipitate from solution and the dialkali metal fluorene-2,7-disulfonate will remain therein and can be recovered in yields of about 85–90% by successive concentration steps.

To prepare 4,4'-dihydroxybiphenyl-2-carboxylic acid from the alkali metal salt of fluorene-2,7-disulfonic acid, the disulfonic acid salt is admixed with 1.1 to 2.5 weight parts of a solid alkali metal hydroxide based upon the weight of the disulfonic acid salt. If less than about 1.1 parts by weight of alkali metal hydroxide is used, there is insufficient conversion of the disulfonic acid salt to the alkali metal salt of 4,4'-dihydroxy-biphenyl-2-carboxylic acid. Economic factors make it undesirable to use greater than about 2.5 weight parts of alkali metal hydroxide.

The fusion temperature used in the process of the invention is of critical importance. Below about 240° C. insufficient reaction occurs and above about 280° C. there is considerable oxidative degradation of the product which is accompanied by the formation of intractible tarry masses. The preferred fusion temperature is 260–270° C. The reaction time, of course, varies with the temperature used. It generally takes from about 4–7 hours to achieve complete fusion.

As we have noted, for purposes of our novel fusion step, sodium hydroxide is not the equivalent of the other alkali metal hydroxides. In the preferred embodiment of the invention using sodium hydroxide, it is necessary to incorporate an alkali metal nitrate within the fusion mass. Using sodium hydroxide in the absence of the alkali metal nitrate results in a very poor yield of the desired product as is well illustrated by Example V, infra.

The preferred alkali metal nitrate from the standpoint of cost is sodium nitrate, although potassium nitrate and lithium nitrate could be used if desired. The mole ratio of alkali metal nitrate to alkali metal salt of fluorene-2,7-disulfonic acid varies from about 0.5:1 to 1.5:1. If insufficient nitrate is present, there is a considerable decrease in the yield of the desired product. No advantage is seen in using a considerable excess of nitrate, although such excess does not appear to be harmful. The preferred mole ratio of nitrate to disulfonic acid salt is 1:1. It is convenient, but not necessary, to dissolve the nitrate in water to aid in uniformly distributing it through the fusion mass.

The desired product, 4,4',-dihydroxybiphenyl-2-carboxylic acid, is recovered from the fused mass using conventional techniques. Preferably, it is recovered by dissolving the mass in water and adding thereto a sufficient quantity of a strong mineral acid to convert the sodium salt of 4,4'-dihydroxybiphenyl-2-carboxylic acid to the free acid. The desired acid precipitates from the aqueous solution and is recovered therefrom by filtration.

The crude product is easily purified by reslurrying the cake and washing it with water. The purified cake is then dried at any convenient temperature, e.g. 100° C., to give the final product, which melts at approximately 270° C.

Our invention is further illustrated by the following examples.

Example I

To 166 g. (1.0 mole) of vigorously stirred molten fluorene at 120° C. was added 289 g. (3.0 moles) of 10% oleum over a one-hour period. During this time the temperature was gradually raised to 170° C. Stirring was continued for an additional 10 minutes at 170° C.; the mixture was then dumped into 0.5 liter of water, and the solution was brought to neutrality by the addition of 480 g. of 50% sodium hydroxide. The precipitated sodium salts were filtered off and the filter cake was dissolved in 3.5 liters of boiling water, cooled to 50° C., and filtered to remove 11 g. (4.3% yield) of sodium fluorene-2-sulfonate.

The filtrate gave, by successive concentrations, four crops of disodium fluorene-2,7-disulfonate totaling 329 g. (89.1% yield).

Dipotassium fluorene-2,7-disulfonate is made as described hereinabove by using potassium hydroxide instead of sodium hydroxide.

Example II

A three-quart Reed-Standard Sigma Blade Mixer was charged with 1,000 g. (25.0 moles) of sodium hydroxide, 215 g. (2.5 moles) of sodium nitrate and 200 ml. of water. The mixture was heated to 260–270° C. and over a period of two hours there was added 925 g. (2.5 moles) of the disodium salt of fluorene-2,7-disulfonic acid. The reaction was continued an additional 4.5 hours at this temperature, allowed to cool, and the fused mass was dissolved in 5.0 liters of water. The pH was adjusted to 4 by the addition of 3,000 g. of 50% sulfuric acid. The precipitate was filtered off, slurried with 1.0 liter of hot water, filtered again and washed with 0.2 liter of water. The wet cake was dried at 100° C. in a vacuum oven to give 450 g. (78.2% yield) of 4,4'-dihydroxybiphenyl-2-carboxylic acid, M.P. 270–271° C.

Example III

The procedure of Example II was substantially repeated, with the exception that the weight ratio of sodium hydroxide to disulfonic acid was raised from 1.1:1 to 2.5:1. The reaction temperature was maintained at 240° C. for seven hours. There was obtained a 92.3% yield of 4,4'-dihydroxybiphenyl-2-carboxylic acid, M.P. 269–270° C.

Example IV

The procedure of Example III was repeated, with the exception that the mole ratio of sodium nitrate to disulfonic acid was changed from 1:1 to 0.33:1. The reaction temperature was maintained at 260° C. for seven hours. There was obtained only a 54% yield of the desired product, M.P. 255–256° C.

Example V

The procedure of Example IV was repeated, with the exception that the sodium nitrate addition was omitted and the temeperature was maintained at 240° C. for six hours. There was obtained only a 22% yield of product, M.P. 273–275° C.

Example VI

The procedure of Example V was repeated, with the exception that the potassium salt of the disulfonic acid was used as the starting material and potassium hydroxide was used in place of sodium hydroxide. The reactants were fused at 270° C. for twelve hours to give an 84.5% yield of the desired product, 4,4'-dihydroxybiphenyl-2-carboxylic acid, M.P. 256–262° C.

Example VII

The procedure of Example VI was repeated, with the exception that the reaction temperature was maintained at 230–360° C. for four hours. Considerable tar formation was observed and there was obtained only a 36.4% yield of product, M.P. 244–245° C.

Example VIII

The procedure of Example VII was repeated, with the exception that the reaction temperature was maintained at 215–220° C. for five hours. There was obtained a 14.7% yield of product, M.P. 260° C.

We have thus provided a novel and efficient method for making the useful 4,4'-dihydroxybiphenyl-2-carboxylic acid. This interesting compound and its lower alkyl esters are, inter alia, effective antioxidants for polymeric materials. For example, they are effective antioxidants for polyethylene when added thereto in amounts ranging between 0.3 and 1% by weight based upon the weight of polymer. In particular, the ethyl ester is effective in inhibiting oxygen uptake of di-(2-ethylhexyl)sebacate at high temperatures (150° C.).

The acid itself has useful insecticidal properties; for example, it is a contact poison against pea aphids, spotted spider mites and house flies. The fungicidal efficacy of the acid has been demonstrated against *Alternaria solani* (control of early blight on tomato foliage), *Rhizoctonia solani* (emergence of pinto beans in infected soil) and against Fusariam, Rhizoctonia and Pythium infected soil (emergence of perfection pea). The acid is nematocidal towards *Panagrellus redivivus*.

We claim:
1. In a method of making 4,4'-dihydroxybiphenyl-2-carboxylic acid from fluorene-2,7-disulfonic acid by fusion with an alkali metal hydroxide, the improvement comprising admixing an alkali metal salt of fluorene-2,7-disulfonic acid with sodium hydroxide, said sodium hydroxide being present in a weight ratio of 1.1–2.5 to 1 based on the weight of said disulfonic acid salt, heating the admixed mass in the presence of an alkali metal nitrate at a temperature of 240–280° C. to effect fusion thereof, said alkali metal nitrate being present in an amount of about 0.5–1 mole for each mole of said disulfonic acid salt in said admixed mass, and recovering 4,4'-dihydroxybiphenyl-2-carboxylic acid from the reaction mixture.

2. Method according to claim 1 wherein said alkali metal nitrate is sodium nitrate.

3. Method according to claim 1 wherein the reaction temperature is maintained at 260–270° C.

4. Method according to claim 1 wherein the alkali metal nitrate is distributed through said admixed mass as an aqueous solution.

References Cited in the file of this patent

Schmidt et al.: Chemical Abstracts, volume 6, page 2753 (1912), (1 page).

Courtet et al.: Chemical Abstracts, volume 19, page 2657 (1925), (1 page).